United States Patent [19]

Noble

[11] Patent Number: 5,161,198
[45] Date of Patent: Nov. 3, 1992

[54] MOBILE RADIO AUDIO SYSTEM

[75] Inventor: Scott W. Noble, Lawrence, Kans.

[73] Assignee: Allied-Signal Inc., Morris Township, Morris County, N.J.

[21] Appl. No.: 700,745

[22] Filed: May 15, 1991

[51] Int. Cl.[5] .............................................. H04B 3/00
[52] U.S. Cl. ........................................ 381/81; 381/85;
381/120; 381/123; 381/28; 330/295; 330/51;
330/124 R
[58] Field of Search ...................... 330/295, 51, 124 R;
381/55, 1, 25, 28, 81, 85, 120, 123, 104

[56] References Cited

U.S. PATENT DOCUMENTS

| | | | |
|---|---|---|---|
| 3,018,445 | 1/1962 | Stone, IV | 330/13 |
| 3,124,757 | 3/1964 | Heyser | 330/17 |
| 4,124,877 | 11/1978 | Vollenweider | 361/393 |
| 4,359,602 | 11/1982 | Ponto et al. | |
| 4,481,660 | 11/1984 | de Koning et al. | 381/58 |
| 4,486,624 | 12/1984 | Puhl et al. | |
| 4,494,077 | 1/1985 | Fukaya et al. | 330/295 |
| 4,675,905 | 6/1987 | Flora et al. | 381/81 |
| 4,691,361 | 9/1987 | Yoshino et al. | 381/81 |
| 4,775,842 | 10/1988 | Rumreich et al. | 330/103 |
| 4,887,298 | 12/1989 | Haigler | 381/55 |
| 4,896,370 | 1/1990 | Kasparian et al. | 455/77 |

Primary Examiner—Forester W. Isen
Attorney, Agent, or Firm—Howard G. Massung; Robert A. Walsh

[57] ABSTRACT

An audio system for use with a mobile radio. More particularly, a microprocessor controlled audio system capable accepting multiple audio input signals and providing an amplified audio signal to a local speaker and a remote speaker without the use of transformers or relays, and capable of driving the speakers either individually or simultaneously. The system provides for increased versatility in output configurations, and allows for microprocessor-controlled muting and power output level switching.

2 Claims, 4 Drawing Sheets

MOBILE RADIO AUDIO SYSTEM

BACKGROUND OF THE INVENTION

The present invention relates to an audio system for use with a mobile radio. More particularly, the audio system disclosed is a microprocessor-controlled system capable of selectively providing an amplified audio signal to a local speaker and/or a remote speaker without the use of transformers or relays. Additionally, the system is capable of increasing the level of audio power which it delivers to a speaker, or muting all audio output in response to microprocessor control signals.

Mobile radio audio systems, such as those usually found in police vehicles or school buses, are often required to perform several roles. Obviously, they must provide the proper amplification of audio signals received over the radio so as to allow the operator to hear incoming communications; the amplified signal usually being fed to a speaker located within the radio itself. They must also be capable of redirecting the audio output to one or more external speakers (such as a speaker located atop a police vehicle or the several often located throughout a bus). Additionally, as the power level required to properly drive an external speaker is often in excess of that required to drive an internal speaker, the audio systems should be able to switchably boost output wattage.

Previously known mobile radio audio amplifier systems have not employed true solid-state switching for redirecting audio output to external speakers, but have relied instead upon one or more relays, and/or manual switches, for accomplishing this switching. As a result, the systems have been limited in their versatility. In addition, the relays often add significantly to the overall physical size of the audio systems, and can prove to be one of the more costly components. The reliability of the relay contacts is also a concern, especially in the hostile environments in which mobile radios are often operated.

Many prior art systems have also employed audio transformers as a means of coupling the amplifier's output to speakers. One function of these transformers is to protect the amplifier circuitry in the event of a short circuit between the audio output and ground. As with the relay, these coupling transformers often prove to be bulky and expensive components.

Accordingly, it is the object of the present invention to provide for an economical, reliable and compact mobile radio audio system which offers microprocessor-controlled speaker switching without the use of relays, and which provides a transformerless amplifier/speaker coupling scheme that protects the system in the event of an output short to ground. The system is based upon a non-traditional bridged amplifier configuration, capable of selectively delivering an audio signal to multiple speaker locations, via a solid-state switching. It is a further object of this invention to allow for multiple speakers to be driven simultaneously, and to provide for an increased power output to be switchably delivered to a remote speaker.

SUMMARY OF THE INVENTION

This invention provides a microprocessor-controlled, mobile radio audio system capable accepting multiple audio inputs and selectively providing an amplified audio output signal to a local speaker and/or a remote speaker without the use of transformers or relays. In a preferred embodiment, the system includes a microprocessor, two microprocessor-controlled solid-state audio switches, two power amplifiers, an internal speaker, and a 3-conductor output jack which accepts a plug mating the system to external speakers. The system is configured so that when a plug is inserted into the jack, the internal speaker is disabled, and so that the audio output of the system may then be switched, in response to control signals from the microprocessor, between multiple external speakers. The system also allows for an increased power level to be selectively delivered to a single external speaker. Complete muting of the system's audio output may also be achieved via microprocessor control.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

Figure 1:
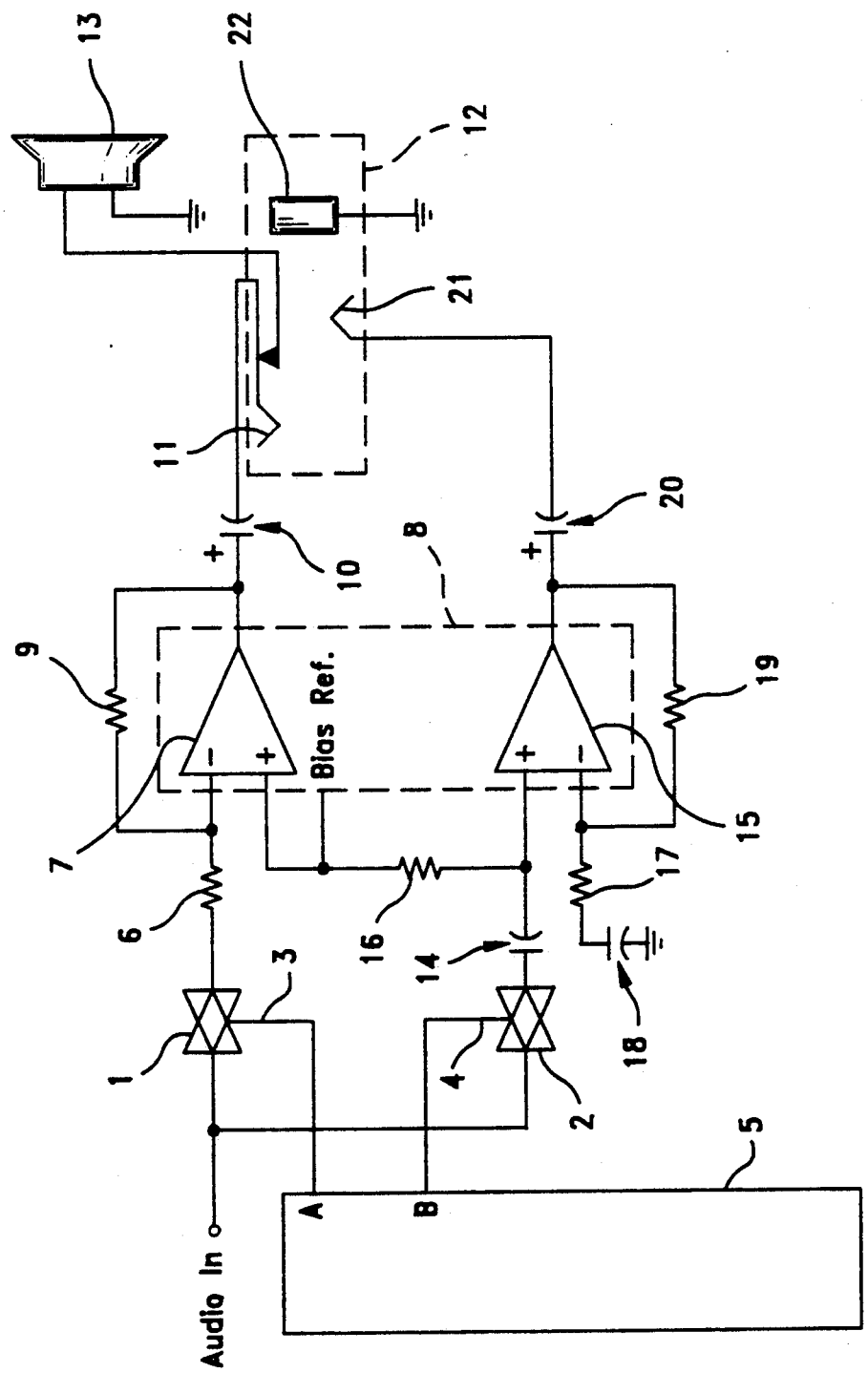
FIG. 1 is a schematic of a preferred embodiment of the invention.

This mobile radio audio system consists of two microprocessor-controlled power amplifiers, capable of switching between a local and/or a remote output speaker, and not containing a transformer or relay. A schematic of one embodiment of the system is shown in FIG. 1.

An audio signal is input to two parallel solid-state attenuators, designated channel A 1 and channel B 2. Each of these attenuators will allow the input signal to pass dependent upon the voltage evident at control line A 3 and control line B 4, both of which are coupled to output terminals A and B of a microprocessor 5. If a high-state signal is evident at a microprocessor output terminal, the attenuator connected to that terminal will allow an input audio signal to pass. If a low-state signal is evident at a microprocessor output terminal, the signal output by the associated attenuator will, for all practical purposes, be zero.

The output of the channel A attenuator is then fed via input resistor 6 to the negative input terminal of a channel A power amplifier 7. This power amplifier is one of two contained within a TDA 1515 stereo amplifier integrated circuit 8 (manufactured by Signetics Corporation, Sunnyvale, Calif.). The negative input terminal of the channel A power amplifier is also connected, via a feedback resistor 9, to that amplifier's output terminal. Additionally, in order to increase the stability of the overall audio system, the positive input terminal of the channel A power amplifier is coupled to a bias reference terminal of the TDA 1515. The output terminal of the channel A power amplifier is coupled to the tip terminal contact 11 of a 3-conductor jack 12, via output capacitor 10. This output capacitor, which facilitates the single-sided operation of the channel A amplifier, also protects that amplifier from damage in the event of a DC short to ground. The tip terminal contact is also connected, via a spring-action contact arm, to one input terminal of an internal speaker 13. This contact is broken when a plug is inserted into the jack and the spring-action arm is displaced. The other terminal of the internal speaker is connected to ground.

The output of the channel B attenuator is fed, via input capacitor 14, to the positive input terminal of a channel B power amplifier 15 (which is the second amplifier contained within the TDA 1515). So as increase the stability of the audio system, the positive input terminal of the channel B power amplifier is also connected, via a biasing resistor 16, to the bias reference terminal of the TDA 1515. The negative input terminal of the channel B power amplifier is tied to ground via a serially connected input resistor 17 and input capacitor 18. This negative input terminal is also connected to the channel B power amplifier output terminal, via a feedback resistor 19. The output terminal of the channel B power amplifier is also coupled, via an output capacitor 20, to the center terminal contact 21 of the 3-conductor jack. This output capacitor, which facilitates the single-sided operation of the channel B amplifier, also protects that amplifier from damage in the event of a DC short to ground. The ground terminal contact 22 of the 3-conductor jack is tied to ground.

In the configuration described above, each power amplifier can typically deliver an output power of approximately 5 watts into a load impedance of 4 ohms.

Without a plug inserted into the 3-conductor jack, the internal speaker is driven by the channel A power amplifier. The output power level delivered to this speaker may be brought to essentially zero by causing a low-state signal to be evident at microprocessor output terminal A. This effectively shuts off the channel A attenuator, prohibits any audio signal from being input to the channel A power amplifier, and mutes the internal speaker. With no plug inserted in to the 3-conductor jack the state of microprocessor output terminal B is irrelevant, as the channel B power amplifier output is not connected to a speaker. Note that upon insertion of a plug into the jack the internal speaker would be taken out of circuit, as the connection between the tip terminal contact and the internal speaker would be broken.

Figure 2A:
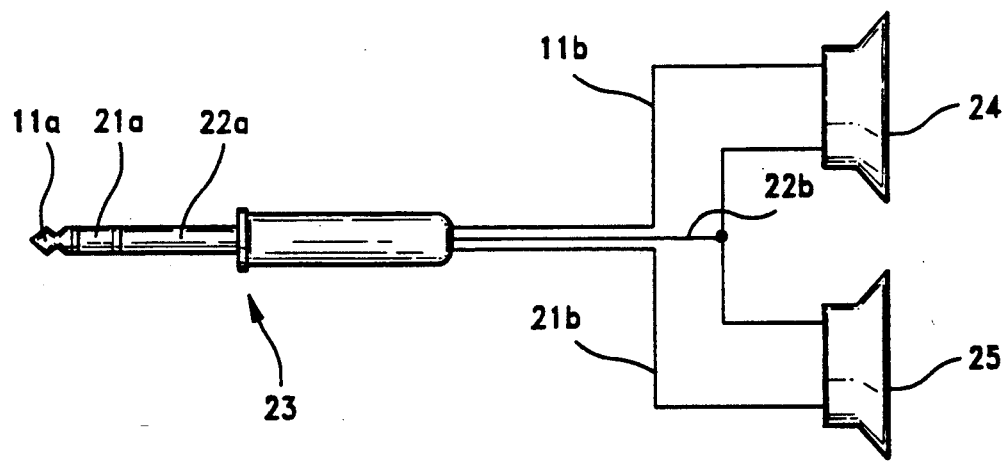
FIG. 2A is a diagram showing a typical 3-conductor plug/two speaker configuration which may be employed with the audio system of FIG. 1.

A suitable 3-conductor plug 23 and speaker arrangement for dual external speaker operation is shown in FIG. 2A; one speaker is designated "local" 24 (driven by the channel A power amplifier), and one is designated "remote" 25 (driven by the channel B power amplifier). The plug effects a connection between the jack tip terminal contact, the plug tip 11a and the positive terminal 11b of the local speaker. The positive terminal 21b of the remote speaker is connected to the plug's center contact region 21a, which, upon insertion, is brought into contact with the center terminal contact of the jack. Additionally, insertion forms a connection between the common ground 22b of the local and remote speakers, the ground terminal 22a of the plug, and the ground terminal contact of the jack. This allows the channel A power amplifier to drive the local speaker, and the channel B power amplifier to drive the remote speaker.

The output power level delivered to either of the two speakers may be brought to essentially zero by causing a low-state signal to be evident at the microprocessor output terminal associated with the amplifier channel driving the speaker. For example, a low-state signal at microprocessor output terminal A would mute the local speaker. With such a 3-conductor plug inserted into the audio system jack the user of the system may select any of the following modes of operation via microprocessor control:

i) dual speaker operation (microprocessor output terminals A and B both at a high-state);

ii) local speaker operation (microprocessor output terminal A at a high-state, microprocessor output terminal B at a low-state)

iii) remote speaker operation (microprocessor output terminal A at a low-state, microprocessor output terminal B at a high-state)

iv) all speakers muted (microprocessor output terminals A and B both at a low-state).

Figure 2B:
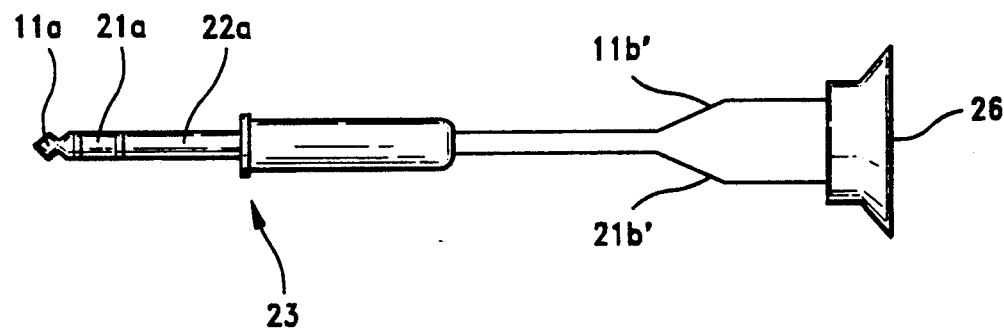
FIG. 2B is a diagram showing a typical 3-conductor plug/single speaker configuration which may be employed with the audio system of FIG. 1.

Alternately, as shown in FIG. 2B, a 3-conductor plug may be inserted into the jack to bridge the power amplifiers and couple the system's output to a single external speaker 26. The maximum power delivered to that speaker may then be increased, via microprocessor control, from a level of approximately 5 to one of approximately 15 watts (assuming a load impedance of 4 ohms). The plug effects a connection between the jack tip terminal contact, the plug tip 11a, and one terminal 11b' of the external speaker. The other terminal 21b' of the external speaker is connected to the plug's center contact region 21a, which, upon insertion, is brought into contact with the center terminal contact of the jack. The ground terminal 22a of the 3-conductor plug is not connected to anything other than the jack's ground terminal contact. This allows both the channel A and channel B power amplifiers to simultaneously drive the single external speaker, thus boosting the maximum power delivered to approximately 15 watts. This particular plug/speaker arrangement allows the user of the system to select any of the following modes of operation via microprocessor control:

i) 15 watt operation (microprocessor output terminals A and B both at a high-state);

ii) 5 watt operation (one microprocessor output terminal at high-state and the other at a low-state)

iii) mute (microprocessor output terminals A and B both at a low-state).

Figure 4:
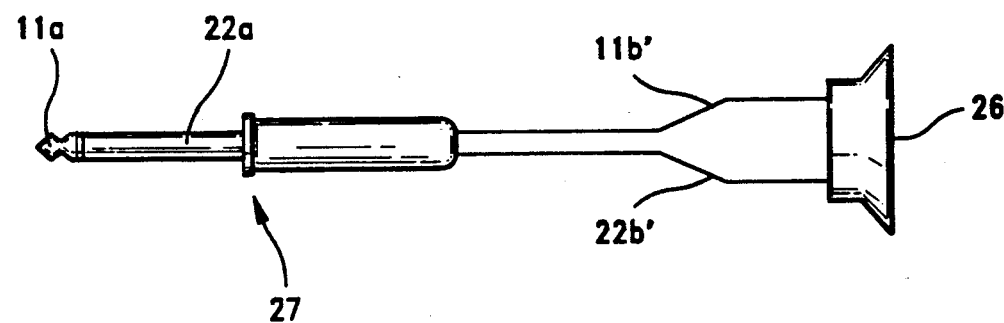
FIG. 4 is a diagram showing a typical 2-conductor plug/single speaker configuration which may be employed with the audio system of FIG. 3.
Figure 3:
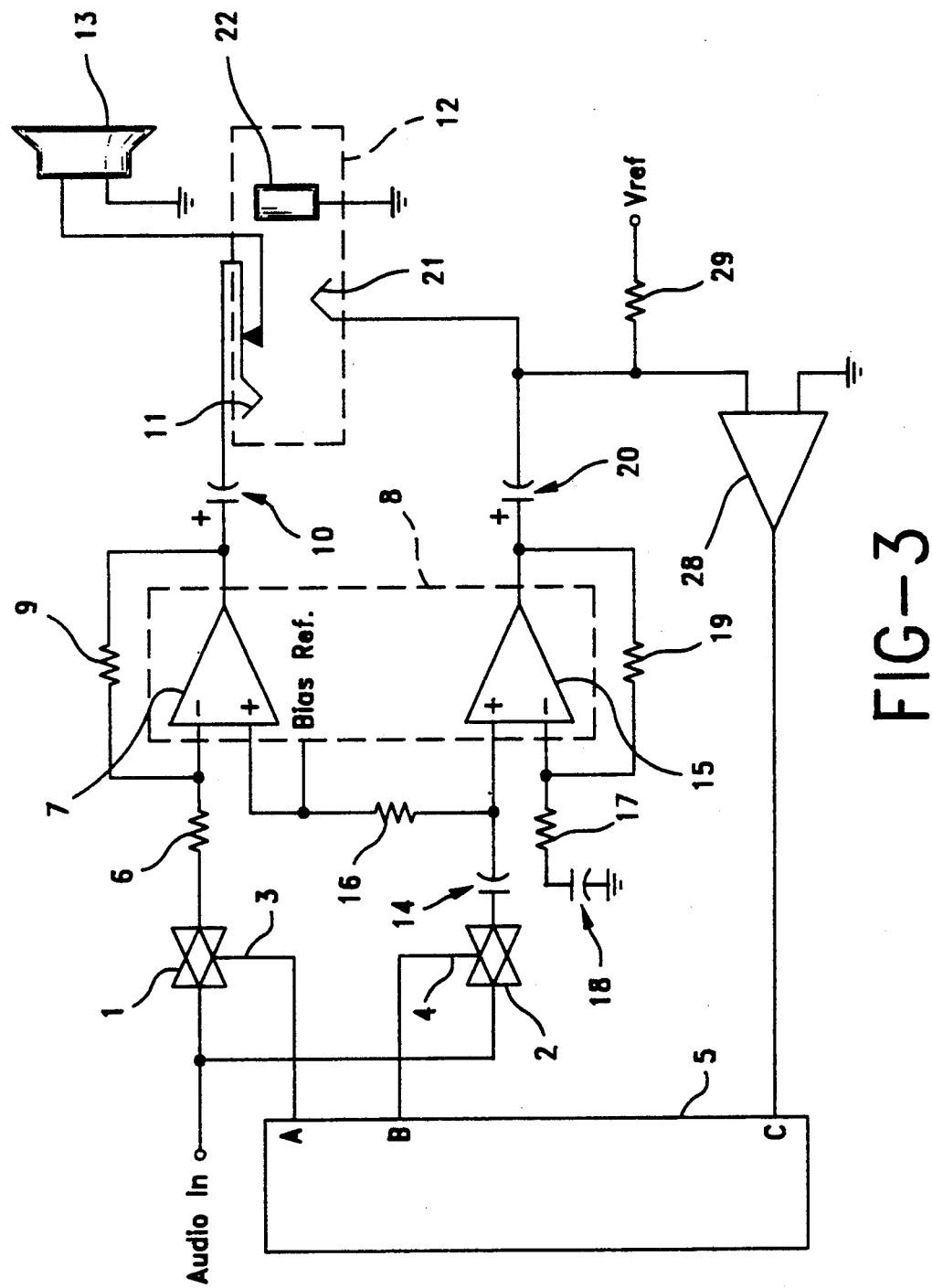
FIG. 3 is a diagram of an embodiment of the invention having zero ohm detection circuitry.

A second embodiment of the invention is illustrated in FIG. 3. The configuration and operation of this embodiment is similar to that of the previously described embodiment, however, this embodiment has additional circuitry which initiates automatic attenuator switching upon detecting a short between ground and the center contact 21 of the 3-conductor jack. While the audio system is protected against damage from DC shorts by its output capacitors, this additional circuitry and switching provides AC short protection. Such a short would occur if a standard 2-conductor plug 27, illustrated in FIG. 4, were to be inserted into the 3-conductor jack. As with the 3-conductor plug, the plug tip 11a would mate with the tip terminal 11 of the jack and effect a connection to one terminal 11b' of the external speaker 26. However, the ground terminal 22a of the 2-conductor plug would connect the other speaker terminal 22b' to both the center terminal contact 21 and the ground terminal contact 22 of the jack; thus exposing the output of the channel B power amplifier to an AC short to ground.

The detection/switching circuitry consists of a comparator 28 having one of its input terminals tied to ground and the other connected to the center contact of the 3-conductor jack. The comparator input terminal connected to the center contact is also coupled to a positive reference voltage $V_{ref}$ via a bias resistor 29. The output of the comparator is connected to an input port C of the microprocessor 5. The value of the reference voltage and the resistance of the pull-up resistor are chosen so that when the center contact of the 3-conductor jack is grounded, the comparator's output changes state. The microprocessor is configured so that the change in the comparator's output (registered at input port C) causes microprocessor output terminal B to assume a low state, thus attenuating any input to the channel B power amplifier, and removing the risk of an output AC signal from that amplifier being shorted to ground.

Figure 5:
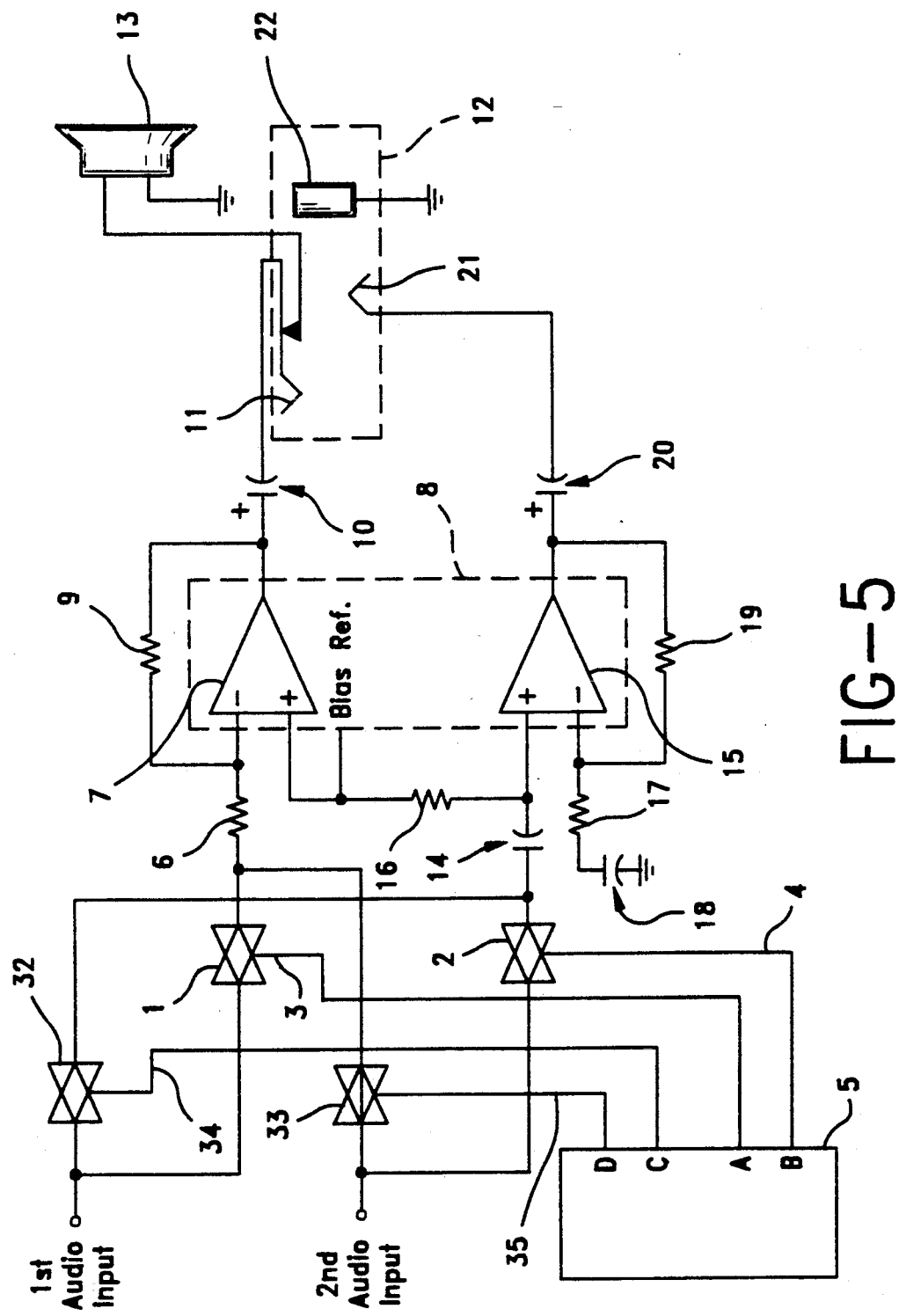
FIG. 5 is a diagram of an embodiment of the invention having multiple audio input terminals.

Yet another embodiment of the invention is illustrated in FIG. 5. The configuration and operation of this embodiment is similar to that of the first embodiment, however, this embodiment has additional circuitry which allows for two separate audio input signals to be selectively routed to the A and/or B channel power amplifiers. The routing of the audio input signals is facilitated by two pairs of microprocessor controlled attenuators, one pair 30, 31 having their inputs coupled to a first audio signal, and the other pair 32, 33 having their inputs coupled to a second audio signal. The output of one attenuator from each pair is coupled to the negative input of the channel A power amplifier, and the output of the other attenuator in each pair is coupled to the positive input of the channel B power amplifier. The attenuators, like those described in the first embodiment, are linked to a microprocessor by control lines A 34, B 35, C 36, and D 37. As with the first embodiment, the signal levels on these control lines may be changed via microprocessor control, thereby changing operating mode of the audio system.

When the above described multiple-input audio system is mated with a 3-conductor plug and speaker arrangement like the one illustrated in FIG. 2A, the following modes of operation are possible:

i) the first audio input signal amplified and fed to dual speakers (microprocessor output terminals A and C at a high-state, microprocessor output terminals B and D at a low-state);

ii) the second audio input signal amplified and fed to dual speakers (microprocessor output terminals B and D at a high-state, microprocessor output terminals A and C at a low-state);

iii) the first audio input signal amplified and fed to a local speaker (microprocessor output terminal A at a high-state, microprocessor output terminals B, C and D at a low-state);

iv) the second audio input signal amplified and fed to a local speaker (microprocessor output terminal D at a high-state, microprocessor output terminals A, B and C at a low-state);

v) the first audio input signal amplified and fed to a remote speaker (microprocessor output terminal C at a high-state, microprocessor output terminals A, B and D at a low-state);

vi) the second audio input signal amplified and fed to a remote speaker (microprocessor output terminal D at a high-state, microprocessor output terminals A, B and C at a low-state);

vii) the first audio input signal amplified and fed to a local speaker, and the second audio input signal amplified and fed to a remote speaker (microprocessor output terminals A and B at a high-state, microprocessor output terminals C and D at a low-state);

viii) the second audio input signal amplified and fed to a local speaker, and the first audio input signal amplified and fed to a remote speaker (microprocessor output terminals C and D at a high-state, microprocessor output terminals A and B at a low-state);

ix) all speakers muted (microprocessor output terminals A, B, C and D at a low-state).

Note that in cases vii and viii above, two distinct audio signals are simultaneously amplified and routed to separate speakers. This arrangement would allow a user of such an audio system to employ one audio channel for monitoring incoming radio transmissions, while at the same time utilizing the second audio channel for public address purposes. Such a feature would prove valuable to police officers who might need to announce information to a crowd over an external speaker, and at the same time continue to monitor any incoming radio messages, or to bus drivers who had to address passengers via speakers within the bus, while monitoring incoming radio transmissions.

Alternately, a 3-conductor plug and speaker arrangement like that illustrated in FIG. 2B may be mated to the multi-input audio system. The system would then be capable of operating in the following modes:

i) first audio input signal amplified to a level of 15 watts (microprocessor output terminals A and C at a high-state, microprocessor output terminals B and D at a low-state);

ii) second audio input signal amplified to a level of 15 watts (microprocessor output terminals B and D at a high-state, microprocessor output terminals A and C at a low-state);

iii) first audio input signal amplified to a level of 5 watts (microprocessor output terminal A at a high-state, microprocessor output terminals B, C and D at a low-state);

iv) second audio input signal amplified to a level of 5 watts (microprocessor output terminal B at a high-state, microprocessor output terminals A, C and D at a low-state);

v) mute (all microprocessor output terminals at a low-state).

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A mobile radio audio system comprising:
   a first audio input terminal;
   a second audio input terminal;
   a microprocessor having a first, second, third and fourth addressable output ports, each of said addressable output ports being capable of maintaining a first and second signal level;
   a first solid-state attenuator means having an input, an output and a control terminal, said first attenuator means having its input coupled to the first audio input terminal, and its control terminal coupled to the first output port of the microprocessor, and said first solid state-attenuator means being responsive to the signal level of the first output port of the microprocessor;

a second solid-state attenuator means having an input, an output and a control terminal, said second attenuator means having its input coupled to the second input terminal, and its control terminal coupled to the second output port of the microprocessor, and said second solid state-attenuator means being responsive to the signal level of the second output port of the microprocessor;

a third solid-state attenuator means having an input, an output and a control terminal, said third attenuator means having its input coupled to the first audio input terminal, and its control terminal coupled to the third output port of the microprocessor, and said third solid state-attenuator means being responsive to the signal level of the third output port of the microprocessor;

a fourth solid-state attenuator means having an input, an output and a control terminal, said fourth attenuator means having its input coupled to the second input terminal, and its control terminal coupled to the fourth output port of the microprocessor, and said fourth solid state-attenuator means being responsive to the signal level of the fourth output port of the microprocessor;

a first amplifier means having an input and an output, said input being coupled to the output of the first and second attenuator means;

a second amplifier means having an input and an output, said input being coupled to the output of the third and fourth attenuator means;

a first output capacitor coupling the output of said first amplifier means to a first audio output contact;

a second output capacitor coupling the output of said second amplifier means to a second audio output contact;

a means for selectively bridging the first and second amplifier means so as to combine their respective audio outputs for application to a single load connected between the audio output contacts;

a means for addressing the microprocessor to effect the switching of the signal levels at said first and second output ports;

a comparator, having an input and an output terminal, said input terminal coupled to one of said audio output contacts, and said output terminal being capable of maintaining a first and second output signal level, dependant upon the impedance evident at the audio output contact to which the comparator input is coupled; and a means for switching the signal level at one of said addressable microprocessor output ports in response to the signal level evident at said comparator output terminal.

2. A mobile radio audio system comprising:

a first audio input terminal;

a second audio input terminal;

a microprocessor having a first, second, third and fourth addressable output ports, each of said addressable output ports being capable of maintaining a first and second signal level;

a first solid-state attenuator means having an input, an output and a control terminal, said first attenuator means having its input coupled to the first audio input terminal, and its control terminal coupled to the first output port of the microprocessor, and said first solid state-attenuator means being responsive to the signal level of the first output port of the microprocessor;

a second solid-state attenuator means having an input, an output and a control terminal, said second attenuator means having its input coupled to the second input terminal, and its control terminal coupled to the second output port of the microprocessor, and said second solid state-attenuator means being responsive to the signal level of the second output port of the microprocessor;

a third solid-state attenuator means having an input, an output and a control terminal, said third attenuator means having its input coupled to the first audio input terminal, and its control terminal coupled to the third output port of the microprocessor, and said third solid state-attenuator means being responsive to the signal level of the third output port of the microprocessor;

a fourth solid-state attenuator means having an input, an output and a control terminal, said fourth attenuator means having its input coupled to the second input terminal, and its control terminal coupled to the fourth output port of the microprocessor, and said fourth solid state-attenuator means being responsive to the signal level of the fourth output port of the microprocessor;

a first amplifier means having an input and an output, said input being coupled to the output of the first and second attenuator means;

a second amplifier means having an input and an output, said input being coupled to the output of the third and fourth attenuator means;

a first output capacitor coupling the output of said first amplifier means to a first audio output contact;

a second output capacitor coupling the output of said second amplifier means to a second audio output contact;

a means for selectively bridging the first and second amplifier means so as to combine their respective audio outputs for application to a single load connected between the audio output contacts; and a means for addressing the microprocessor to effect the switching of the signal levels at said first, second, third and fourth output ports.

* * * * *